US012696335B2

(12) United States Patent
Shrestha et al.

(10) Patent No.: US 12,696,335 B2
(45) Date of Patent: Jul. 28, 2026

(54) LOCATION INFORMATION PROVISION FOR NARROWBAND INTERNET OF THINGS USER EQUIPMENT

(71) Applicant: QUALCOMM Incorporated, San Diego, CA (US)

(72) Inventors: Bharat Shrestha, San Diego, CA (US); Rajeev Kumar, San Diego, CA (US); Alberto Rico Alvarino, San Diego, CA (US); Umesh Phuyal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 520 days.

(21) Appl. No.: 18/170,249

(22) Filed: Feb. 16, 2023

(65) Prior Publication Data

US 2024/0284534 A1 Aug. 22, 2024

(51) Int. Cl.
*H04W 72/23* (2023.01)
*H04W 72/0446* (2023.01)
*H04W 76/18* (2018.01)
(52) U.S. Cl.
CPC ....... *H04W 76/18* (2018.02); *H04W 72/0446* (2013.01); *H04W 72/23* (2023.01)
(58) Field of Classification Search
CPC . H04W 76/18; H04W 72/0446; H04W 72/23; H04W 64/006; H04W 28/0284; H04W 4/80; H04W 28/028; H04W 8/24
See application file for complete search history.

(56) References Cited

U.S. PATENT DOCUMENTS

| | | | | |
|---|---|---|---|---|
| 2019/0253986 A1* | 8/2019 | Jeon | | H04W 16/28 |
| 2021/0329587 A1* | 10/2021 | Höglund | | H04W 8/24 |
| 2022/0077982 A1* | 3/2022 | Zhang | | H04L 5/0053 |
| 2023/0397080 A1* | 12/2023 | Parichehrehteroujeni | | |
| | | | | H04W 36/08 |
| 2024/0421957 A1* | 12/2024 | Koskela | | H04L 5/0094 |

FOREIGN PATENT DOCUMENTS

| | | |
|---|---|---|
| WO | 2019018831 | 1/2019 |
| WO | 2021153983 A1 | 8/2021 |

OTHER PUBLICATIONS

Ericsson [Rapporteur]: "[NB-Iot] Email Discussion Report on RLF for SON", 3GPP TSG-RAN WG2 #105, R2-1901185, 3rd Generation Partnership Project, Mobile Competence Centre, 650, Route Des Lucioles, F-06921 Sophia-Antipolis Cedex, France, vol. Ran WG2, No. Athens, Greece, Feb. 25, 2019-Mar. 1, 2019, Feb. 15, 2019, 18 Pages, XP051602544, Sections 2,3.
International Search Report and Written Opinion—PCT/US2024/010306—ISA/EPO—Apr. 26, 2024.

(Continued)

*Primary Examiner* — Wei Zhao
(74) *Attorney, Agent, or Firm* — Harrity & Harrity, LLP

(57) ABSTRACT

Various aspects of the present disclosure generally relate to wireless communication. In some aspects, a user equipment (UE) may receive implicit or explicit information indicating whether to include location information in an uplink message based at least in part on whether the UE is a narrowband Internet of Things (NB-IoT) UE. The UE may transmit the uplink message in accordance with the implicit or explicit information. Numerous other aspects are described.

30 Claims, 9 Drawing Sheets

(56)  References Cited

OTHER PUBLICATIONS

Qualcomm Incorporated: "NB-Iot UE Location Info in RLF Report", 3GPP TSG-RAN WG2 Meeting #122, R2-2306034, 3rd Generation Partnership Project, Mobile Competence Centre, 650, Route Des Lucioles, F-06921 Sophia-Antipolis Cedex, France, vol. RAN WG2, No. Incheon, Korea, May 22, 2023-May 26, 2023, May 12, 2023, 3 Pages, XP052390786, The Whole Document.

Xiaomi [To Be SA3]: "[Draft] Reply LS on Security Concerns for UE Providing Location Information for NB-Iot" 3GPP TSG-SA3 Meeting #106-e, S3-220273, 3rd Generation Partnership Project, Mobile Competence Centre, 650, Route Des Lucioles, F-06921 Sophia-Antipolis Cedex, France, vol. Sa WG3, No. e-meeting, Feb. 14, 2022- Feb. 25, 2022, Feb. 7, 2022, 1 Page, XP052194705, The Whole Document.

* cited by examiner

400

410
Information indicating whether to include location information in uplink message 420
Uplink message (e.g., RLF report)
May include location information in accordance with information UE
(e.g., NB-IoT UE)

NN

500

510    Receive implicit or explicit information indicating whether to include location information in an uplink message based at least in part on whether the user equipment (UE) is a narrowband Internet of Things (NB-IoT) UE 520    Transmit the uplink message in accordance with the implicit or explicit information

600

610　Receive a UE information request message for NB-IoT UEs, wherein the UE is an NB-IoT UE 620　Transmit a radio link failure report in response to the UE information request message, wherein the radio link failure report omits location information of the UE based at least in part on the UE being an NB-IoT UE 710 — Output information indicating whether to include location information in an uplink message based at least in part on whether a UE is an NB-IoT UE 720 — Obtain the uplink message in accordance with the implicit or explicit information

700

LOCATION INFORMATION PROVISION FOR NARROWBAND INTERNET OF THINGS USER EQUIPMENT

FIELD OF THE DISCLOSURE

Aspects of the present disclosure generally relate to wireless communication and to techniques and apparatuses for location information provision for a narrowband Internet of Things (NB-IoT) user equipment (UE).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving implicit or explicit information indicating whether to include location information in an uplink message based at least in part on whether the UE is a narrowband Internet of Things (NB-IoT) UE. The method may include transmitting the uplink message in accordance with the implicit or explicit information.

Some aspects described herein relate to a method of wireless communication performed by a UE. The method may include receiving a UE information request message for NB-IoT UEs, wherein the UE is an NB-IoT UE. The method may include transmitting a radio link failure report in response to the UE information request message, wherein the radio link failure report omits location information of the UE based at least in part on the UE being an NB-IoT UE.

Some aspects described herein relate to a method of wireless communication performed by a network node. The method may include outputting information indicating whether to include location information in an uplink message based at least in part on whether a UE is an NB-IoT UE. The method may include obtaining the uplink message in accordance with the implicit or explicit information.

Some aspects described herein relate to a UE for wireless communication. The UE may include a memory and one or more processors coupled to the memory. The one or more processors may be configured to receive implicit or explicit information indicating whether to include location information in an uplink message based at least in part on whether the UE is an NB-IoT UE. The one or more processors may be configured to transmit the uplink message in accordance with the implicit or explicit information.

Some aspects described herein relate to a UE for wireless communication. The UE may include a memory and one or more processors coupled to the memory. The one or more processors may be configured to receive a UE information request message for NB-IoT UEs, wherein the UE is an NB-IoT UE. The one or more processors may be configured to transmit a radio link failure report in response to the UE information request message, wherein the radio link failure report omits location information of the UE based at least in part on the UE being an NB-IoT UE.

Some aspects described herein relate to a network node for wireless communication. The network node may include a memory and one or more processors coupled to the memory. The one or more processors may be configured to output information indicating whether to include location information in an uplink message based at least in part on whether a UE is an NB-IoT UE. The one or more processors may be configured to obtain the uplink message in accordance with the implicit or explicit information.

Some aspects described herein relate to a non-transitory computer-readable medium that stores a set of instructions for wireless communication by a UE. The set of instructions, when executed by one or more processors of the UE, may cause the UE to receive implicit or explicit information indicating whether to include location information in an uplink message based at least in part on whether the UE is an NB-IoT UE. The set of instructions, when executed by one or more processors of the UE, may cause the UE to transmit the uplink message in accordance with the implicit or explicit information.

Some aspects described herein relate to a non-transitory computer-readable medium that stores a set of instructions for wireless communication by an UE. The set of instructions, when executed by one or more processors of the UE, may cause the UE to receive a UE information request message for NB-IoT UEs, wherein the UE is an NB-IoT UE. The set of instructions, when executed by one or more processors of the UE, may cause the UE to transmit a radio link failure report in response to the UE information request message, wherein the radio link failure report omits location information of the UE based at least in part on the UE being an NB-IoT UE.

Some aspects described herein relate to a non-transitory computer-readable medium that stores a set of instructions for wireless communication by a network node. The set of instructions, when executed by one or more processors of the network node, may cause the network node to output information indicating whether to include location information in an uplink message based at least in part on whether a UE is an NB-IoT UE. The set of instructions, when executed by one or more processors of the network node, may cause the network node to obtain the uplink message in accordance with the implicit or explicit information.

Some aspects described herein relate to an apparatus for wireless communication. The apparatus may include means for receiving implicit or explicit information indicating whether to include location information in an uplink message based at least in part on whether the apparatus is an NB-IoT UE. The apparatus may include means for transmitting the uplink message in accordance with the implicit or explicit information.

Some aspects described herein relate to an apparatus for wireless communication. The apparatus may include means for receiving a UE information request message for NB-IoT UEs, wherein the apparatus comprises an NB-IoT UE. The apparatus may include means for transmitting a radio link failure report in response to the UE information request message, wherein the radio link failure report omits location information of the apparatus based at least in part on the UE being an NB-IoT UE.

Some aspects described herein relate to an apparatus for wireless communication. The apparatus may include means for outputting information indicating whether to include location information in an uplink message based at least in part on whether a UE is an NB-IoT UE. The apparatus may include means for obtaining the uplink message in accordance with the implicit or explicit information.

Aspects generally include a method, apparatus, system, computer program product, non-transitory computer-readable medium, user equipment, base station, network entity, network node, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
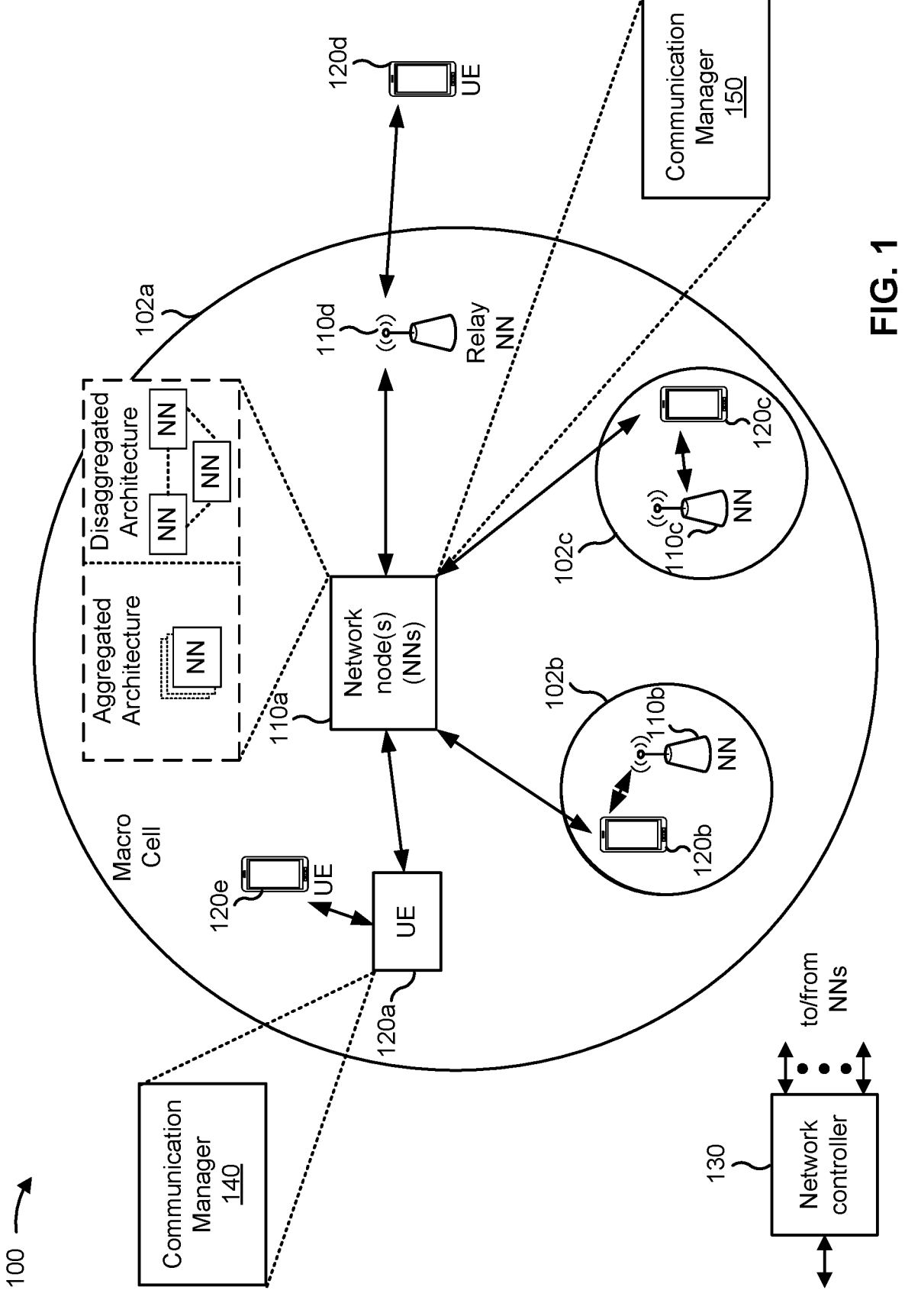
FIG. 1 is a diagram illustrating an example of a wireless network, in accordance with the present disclosure.

Different user equipments (UEs) may have different capabilities and may access a network using different technologies. For example, some UEs may utilize narrowband Internet of Things (NB-IoT) technology. NB-IoT is a low-power, wide-area (LPWA) networking technology that is designed for Internet of Things (IoT) devices. NB-IoT may operate in the licensed spectrum, making NB-IoT communication more secure and reliable as compared to other LPWA technologies that may operate in unlicensed spectrum (though unlicensed NB-IoT has also been explored). NB-IoT provides low-cost connectivity to IoT devices, and supports a wide range of use cases, including metering, monitoring, and control of assets and devices. A UE that connects to an NB-IoT network may be referred to as an NB-IoT UE. Some examples of NB-IoT UEs include smart meters, asset trackers, and environmental monitoring devices.

Some NB-IoT UEs may not support or operate with application stratum (AS) security establishment, meaning that a location of such an NB-IoT UE cannot be reported to the network via a radio resource control (RRC) message. Furthermore, traditional Long Term Evolution (LTE) positioning procedures (LPPs) may use significant storage space and may not be supported by an NB-IoT UE. Furthermore, the network may be required to obtain user consent (e.g., from a user of the UE) prior to requesting a UE location from the UE. In some radio access technologies (RATs), a UE can provide a UE location via a radio link failure (RLF) report, which may typically be used for self-organizing networks (SONs) and minimization of drive testing (MDT). However, a UE may be unaware of whether the network has obtained the relevant user consent when reporting a location in an RLF report. If an NB-IoT UE cannot report location information to the network (for example, due to a lack of user consent, unawareness of whether user consent has been obtained, or a lack of AS security), then operations utilizing the location information (such as SON operations, MDT operations, or other operations) may be negatively impacted. For example, the network may sub-optimally allocate resources or may improperly configure operational parameters of the NB-IoT UE, such that power consumption is increased or efficiency of communication is decreased at the NB-IoT UE.

Some techniques described herein provide signaling of location information of an NB-IoT UE. For example, the NB-IoT UE may receive information indicating whether to include location information in an uplink message. This information may be based at least in part on whether the UE is an NB-IoT UE. The NB-IoT UE may transmit the uplink message in accordance with the information. In some aspects, the uplink message may omit the location information. For example, the information may indicate not to include the location information, or the NB-IoT UE may omit the location information based on the NB-IoT UE being an NB-IoT UE. In some other aspects, the uplink message may include the location information. For example, the information may indicate to include the location information, or the NB-IoT UE may provide the location information based on the NB-IoT UE being an NB-IoT UE. By providing the location information, operations utilizing the location information are facilitated. For example, the network may more optimally allocate resources or may configure operational parameters of the NB-IoT UE such that power consumption is reduced or efficiency of communication is increased at the NB-IoT UE relative to if the NB-IoT UE does not provide the location information. By omitting the location information, user privacy is preserved and overhead associated with establishing AS security is reduced.

Various aspects of the disclosure are described more fully hereinafter with reference to the accompanying drawings.

This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUS)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHZ), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive implicit or explicit information indicating whether to include location information in an uplink message based at least in part on whether the UE 120 is an NB-IoT UE; and transmit the uplink message in accordance with the implicit or explicit information. In some aspects, the communication manager 140 may receive a UE information request message for NB-IoT UEs, wherein the UE 120 is an NB-IoT UE; and transmit a radio link failure report in response to the UE information request message, wherein the radio link failure report omits location information of the UE based at least in part on the UE 120 being an NB-IoT UE. Additionally, or alternatively, the communication manager 140 may perform one or more other operations described herein.

In some aspects, the network node 110 may include a communication manager 150. As described in more detail elsewhere herein, the communication manager 150 may output information indicating whether to include location information in an uplink message based at least in part on whether a UE is a narrowband Internet of Things (NB-IoT) UE; and obtain the uplink message in accordance with the implicit or explicit information. Additionally, or alternatively, the communication manager 150 may perform one or more other operations described herein.

As indicated above, FIG. 1 is provided as an example. Other examples may differ from what is described with regard to FIG. 1.

Figure 2:
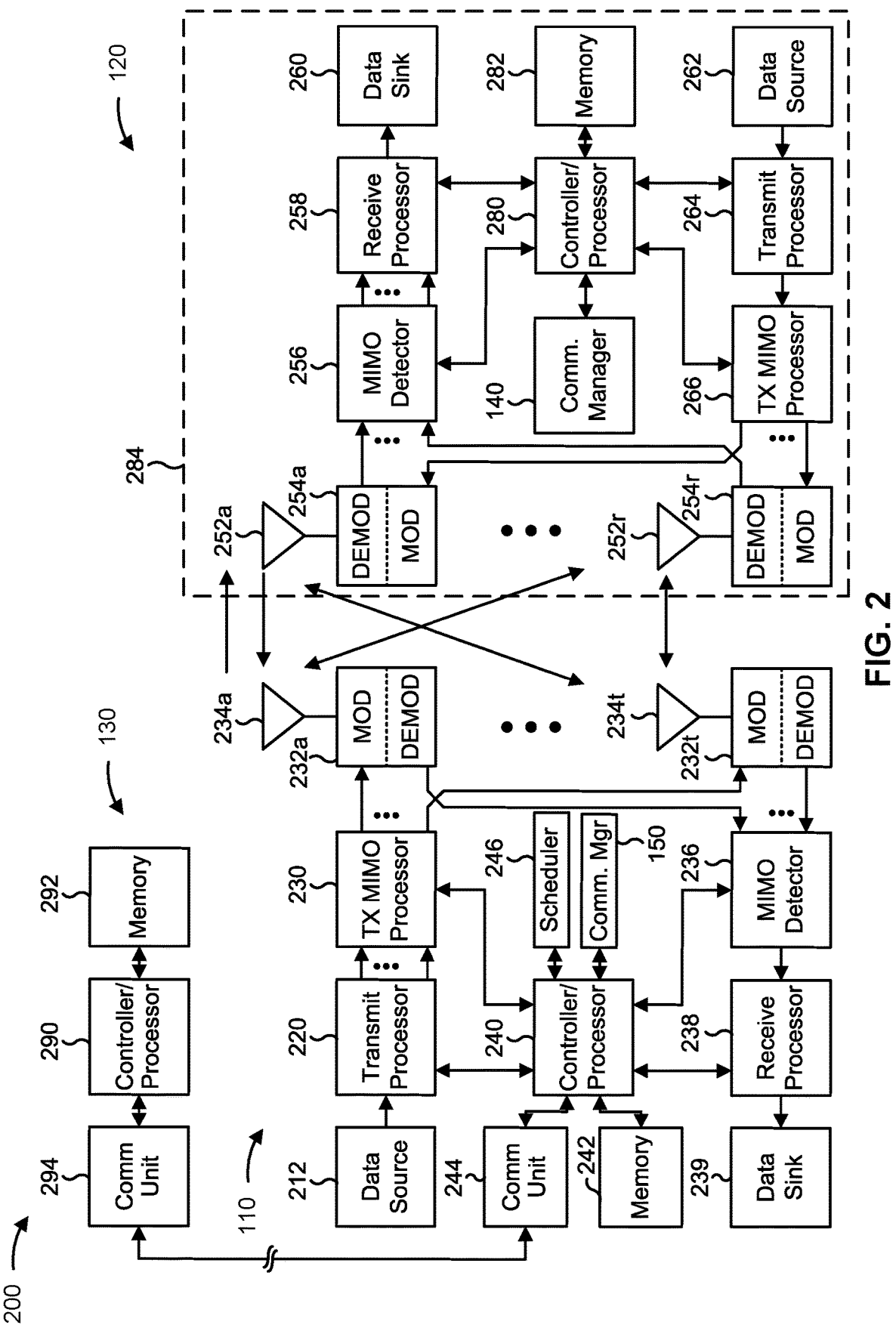
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-9).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-9).

The controller/processor 240 of the network node 110, the controller/processor 280 of the UE 120, and/or any other component(s) of FIG. 2 may perform one or more techniques associated with NB-IoT communication, as described in more detail elsewhere herein. For example, the controller/ processor 240 of the network node 110, the controller/processor 280 of the UE 120, and/or any other component(s) of FIG. 2 may perform or direct operations of, for example, process 500 of FIG. 5, process 600 of FIG. 6, process 700 of FIG. 7, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 500 of FIG. 5, process 600 of FIG. 6, process 700 of FIG. 7, and/or other processes as described herein. In some examples, executing instructions may include running the instructions, converting the instructions, compiling the instructions, and/or interpreting the instructions, among other examples.

In some aspects, the UE 120 includes means for receiving implicit or explicit information indicating whether to include location information in an uplink message based at least in part on whether the UE is an NB-IoT UE; and/or means for transmitting the uplink message in accordance with the implicit or explicit information. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the UE 120 includes means for receiving a UE information request message for NB-IoT UEs, wherein the UE is an NB-IoT UE; and/or means for transmitting a radio link failure report in response to the UE information request message, wherein the radio link failure report omits location information of the UE based at least in part on the UE being an NB-IoT UE. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node 110 includes means for outputting information indicating whether to include location information in an uplink message based at least in part on whether a UE is an NB-IoT UE; and/or means for obtaining the uplink message in accordance with the implicit or explicit information. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
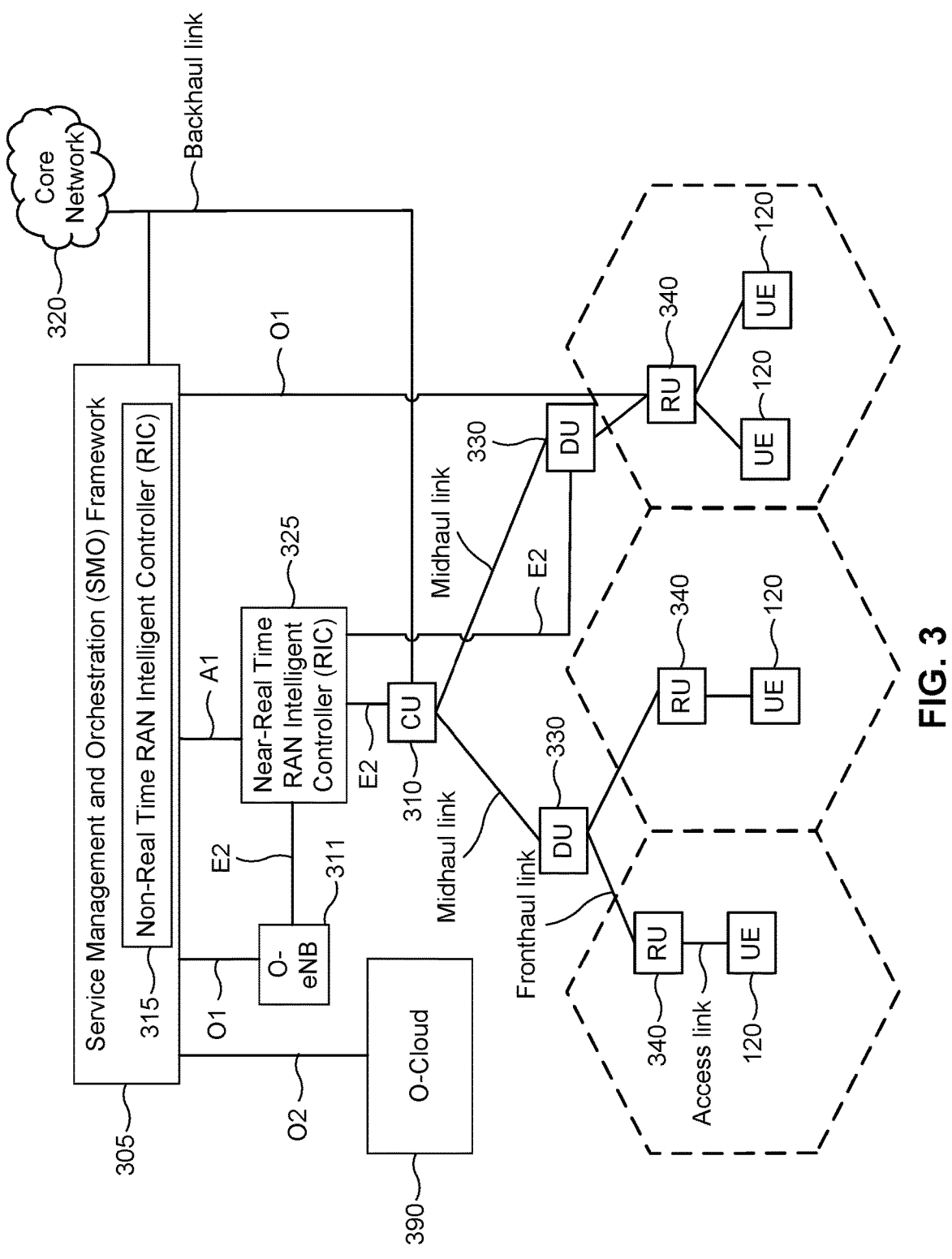
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces.

Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUS 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
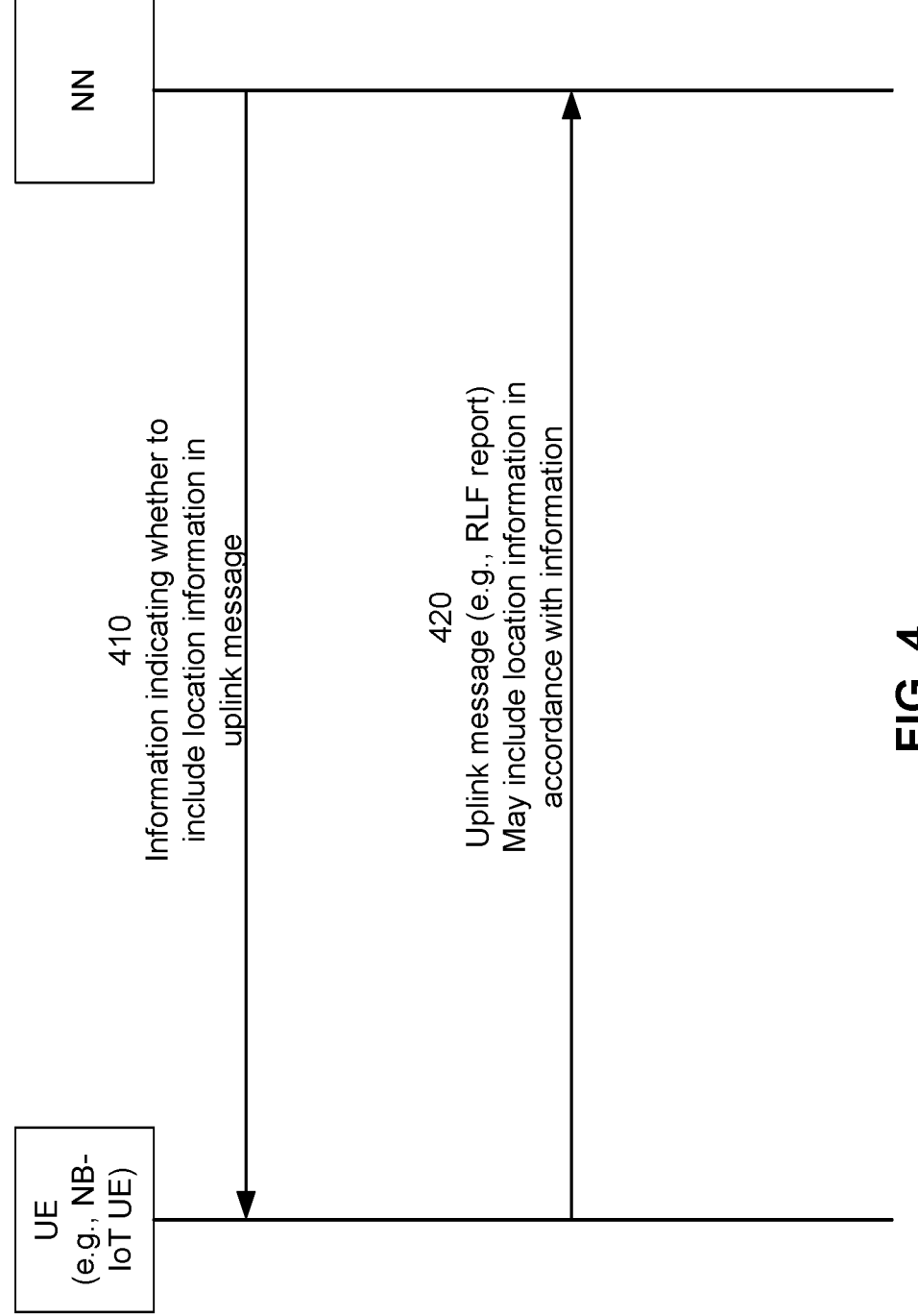
FIG. 4 is a diagram illustrating an example of signaling associated with transmission of location information by a narrowband Internet of Things (NB-IoT) UE, in accordance with the present disclosure.

FIG. 4 is a diagram illustrating an example 400 of signaling associated with transmission of location information by an NB-IoT UE, in accordance with the present disclosure. Example 400 includes an NB-IoT UE (e.g., UE 120) and a network node (e.g., network node 110). The NB-IoT UE may communicate with the network node via NB-IoT communication. For example, the NB-IoT UE may use narrowband-specific signaling and communication parameters. In some aspects, the network node may be associated with a non-terrestrial network (NTN).

Example 400 relates to an RLF report (sometimes referred to herein as an uplink message). An RLF report is an optional feature for an NB-IoT UE. If the NB-IoT UE supports RLF reporting, then after RLF, the NB-IoT UE may prepare the RLF report. When establishing or reestablishing an RRC connection, the NB-IoT UE may indicate to the network node (e.g., in an RRC reestablishment message such as in msg5 of a four-step random access procedure) that the NB-IoT UE has an RLF report available. The network node may request for the NB-IoT UE to send the RLF report via a message (e.g., an (UEInformationRequest-NB message). The NB-IoT UE may provide the RLF report (e.g., via an RLF-Report-NB parameter) via an uplink message (e.g., a UEInformationResponse-NB message).

As shown by reference number 410, the NB-IoT UE may receive, and the network node may output, information indicating whether to include location information in an uplink message based at least in part on whether the NB-IoT UE is an NB-IoT UE. In some aspects, the information may be explicit (e.g., the information may include a field that indicates whether or not to include location information). In some other aspects, the information may be implicit. For example, a message relating to another procedure (e.g., a system information transmission for NB-IoT or the like) may indicate to the NB-IoT UE whether or not to include location information, without including a field that explicitly indicates whether to include the location information. In some aspects, the information may be based at least in part on whether the NB-IoT UE is an NB-IoT UE (e.g., the information may be formatted or provided via a message specific to NB-IoT communication). As another example, whether or not to include location information in the uplink message may be based at least in part on whether the NB-IoT UE is an NB-IoT UE. For example, the message may implicitly indicate not to include the location information because the message is specific to NB-IoT and the provision of location information by NB-IoT UEs is not permitted.

In some aspects, the information indicating whether to include the location information may be included in a UE information request message (e.g., a UEInformationRequest-NB message). For example, the UE information request message may include an indication (e.g., the indication may be the information indicating whether to include the location information). If the indication is set to a first value (e.g., true), the information may indicate to include the location information in the uplink message. If the indication is set to a second value (e.g., false), the information may indicate to not include the location information in the uplink message. In this example, the information (e.g., the indication) may indicate whether to include the location information in an RLF report, as described below.

In some aspects, the information indicating whether to include the location information may be received after establishing AS security. For example, the NB-IoT UE may optionally establish AS security prior to receiving the information indicating whether to include the location information, as shown by reference number 420. In this example, the information indicating whether to include the location information may be received via an RRC message (e.g., the information may include a parameter of the RRC information such as "obtainLocationInfo"), a MAC control element (MAC-CE), or a combination thereof. For example, upon receiving the information indicating whether to include the location information, the UE may include location information in an uplink message. In some aspects, the information indicating whether to include location information may be received via a non-access stratum (NAS) message. For example, the network node (e.g., a core network node) may indicate whether the UE can include location information during a registration process, a tracking area update procedure, or the like. In some aspects, the network node may provide the information via the NAS message based at least in part on having obtained user consent. For example, providing the information via the NAS message may indicate that the network node has obtained user consent for a user associated with the NB-IoT UE.

In some aspects, the information indicates to include the location information based at least in part on user consent, associated with the UE, to providing the location information having been obtained. In some aspects, the network node may request the location information only after obtaining user consent. For example, if there is no user consent, the network node may not configure a parameter indicating to provide the RLF report (e.g., rlf-ReportReq) (e.g., the network node may not configure the parameter if the network node is a non-terrestrial network (NTN) node, or if the UE is capable of obtaining a Global Navigational Satellite System (GNSS) location). In some aspects, the user consent may be implicit. For example, for an NTN, a user consent may be assumed based on the NB-IoT UE subscribing to an NTN service. Accordingly, the UE may include location information in an RLF report or another uplink message. However, in case of a terrestrial network (TN), such as when the UE is connected to a TN, the UE may not include location information in an RLF report.

In some aspects, the information indicating whether to include the location is included in an RLF report request. For example, the network node may configure the RLF report request (e.g., rlf-ReportReq) without the UE having provided an indication of RLF report availability (e.g., in msg5 of a random access procedure). In this example, the information indicating whether to include the location may be considered implicit in the RLF report request, since configuring the RLF report request without having received an indication of RLF report availability may implicitly indicate that the network has obtained user consent and/or requests location information without an accompanying RLF report (since no RLF report is available at the UE).

As shown by reference number 420, the NB-IoT UE may transmit an uplink message. In some aspects, the uplink message may be an RLF report. In some other aspects, the uplink message may be an RRC message (e.g., a location report) or another form of message. In some aspects, the uplink message may include the location information. For example, an RLF report may include a locationInfo field that identifies the location information of the UE. As another example, a location report may include a field that identifies the location information of the UE. The uplink message may include the location information if the information indicating whether to include the location information explicitly or implicitly indicates to include the location information in the uplink message.

In some aspects, the uplink message may not include the location information. For example, the information indicating whether to include the location information may indicate not to include the location information in the uplink message. As another example, the NB-IoT UE may not provide the location information based on the NB-IoT UE being an NB-IoT UE. For example, NB-IoT UEs may not be permitted to provide location information in an RLF report. In this example, the uplink message may include any message transmitted by the NB-IoT UE. In this example, the NB-IoT UE may not receive information indicating whether to include the location information in the uplink message. For example, the NB-IoT UE may receive a UE information request for NB-IoT UEs (e.g., UEInformationRequest-NB), and may transmit an RLF report in response to the UE information request message, where the RLF report omits location information based on the UE being an NB-IoT UE. Omitting the location information based at least in part on the UE being an NB-IoT UE may reduce signaling overhead relative to explicitly or implicitly indicating whether to include the location information. Explicitly or implicitly indicating whether to include the location information may provide increased flexibility (with regard to whether user consent has been obtained) and may facilitate the successful operation of location-based services in the network.

As indicated above, FIG. 4 is provided as an example. Other examples may differ from what is described with regard to FIG. 4.

Figure 5:
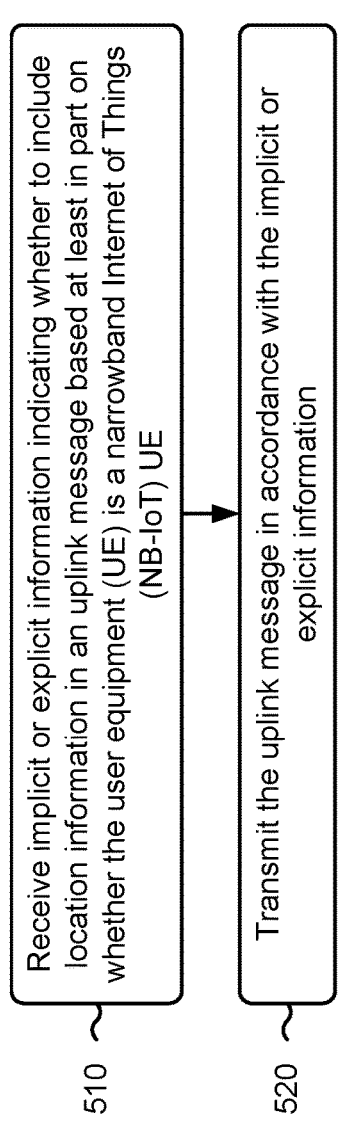
FIG. 5 is a diagram illustrating an example process performed, for example, by a UE, in accordance with the present disclosure.

FIG. 5 is a diagram illustrating an example process 500 performed, for example, by a UE, in accordance with the present disclosure. Example process 500 is an example where the UE (e.g., UE 120) performs operations associated with location information provision for NB-IoT.

As shown in FIG. 5, in some aspects, process 500 may include receiving implicit or explicit information indicating whether to include location information in an uplink message based at least in part on whether the UE is an NB-IoT UE (block 510). For example, the UE (e.g., using reception component 802 and/or communication manager 806, depicted in FIG. 8) may receive implicit or explicit information indicating whether to include location information in an uplink message based at least in part on whether the UE is an NB-IoT UE, as described above.

As further shown in FIG. 5, in some aspects, process 500 may include transmitting the uplink message in accordance with the implicit or explicit information (block 520). For example, the UE (e.g., using transmission component 804 and/or communication manager 806, depicted in FIG. 8) may transmit the uplink message in accordance with the implicit or explicit information, as described above.

Process 500 may include additional aspects, such as any single aspect or any combination of aspects described below and/or in connection with one or more other processes described elsewhere herein.

In a first aspect, the uplink message includes the location information based at least in part on the implicit or explicit information indicating to include the location information.

In a second aspect, alone or in combination with the first aspect, the uplink message does not include the location information based at least in part on the implicit or explicit information indicating not to include the location information.

In a third aspect, alone or in combination with one or more of the first and second aspects, the implicit or explicit information indicating whether to include the location information in the uplink message is included in a UE information request message, and the uplink message is a radio link failure report.

In a fourth aspect, alone or in combination with one or more of the first through third aspects, process 500 includes establishing access stratum security prior to receiving the implicit or explicit information, wherein the implicit or explicit information is included in at least one of a radio resource control message or a medium access control control element.

In a fifth aspect, alone or in combination with one or more of the first through fourth aspects, process 500 includes establishing access stratum security prior to receiving the implicit or explicit information, wherein the implicit or explicit information is included in a non-access-stratum message.

In a sixth aspect, alone or in combination with one or more of the first through fifth aspects, the implicit or explicit information indicates to include the location information based at least in part on user consent, associated with the UE, to providing the location information having been obtained.

In a seventh aspect, alone or in combination with one or more of the first through sixth aspects, the implicit or explicit information indicating whether to include the location information is included in a radio link failure report request, and receiving the implicit or explicit information indicating whether to include the location information further comprises receiving the radio link failure report request without having provided an indication of radio link failure report availability.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
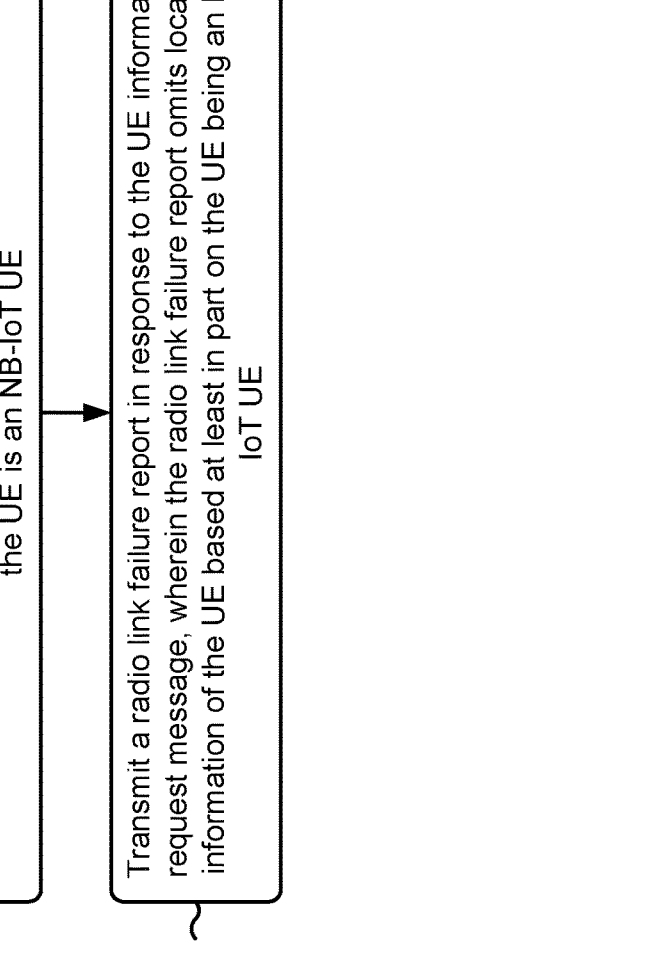
FIG. 6 is a diagram illustrating an example process performed, for example, by a UE, in accordance with the present disclosure.

FIG. 6 is a diagram illustrating an example process 600 performed, for example, by a UE, in accordance with the present disclosure. Example process 600 is an example where the UE (e.g., UE 120) performs operations associated with location information provision for NB-IoT.

As shown in FIG. 6, in some aspects, process 600 may include receiving a UE information request message for NB-IoT UEs, wherein the UE is an NB-IoT UE (block 610). For example, the UE (e.g., using reception component 802 and/or communication manager 806, depicted in FIG. 8) may receive a UE information request message for narrowband Internet of Things (NB-IoT) UEs, wherein the UE is an NB-IoT UE, as described above.

As further shown in FIG. 6, in some aspects, process 600 may include transmitting a radio link failure report in response to the UE information request message, wherein the radio link failure report omits location information of the UE based at least in part on the UE being an NB-IoT UE (block 620). For example, the UE (e.g., using transmission component 804 and/or communication manager 806, depicted in FIG. 8) may transmit a radio link failure report in response to the UE information request message, wherein the radio link failure report omits location information of the UE based at least in part on the UE being an NB-IoT UE, as described above.

Process 600 may include additional aspects, such as any single aspect or any combination of aspects described in connection with one or more other processes described elsewhere herein.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
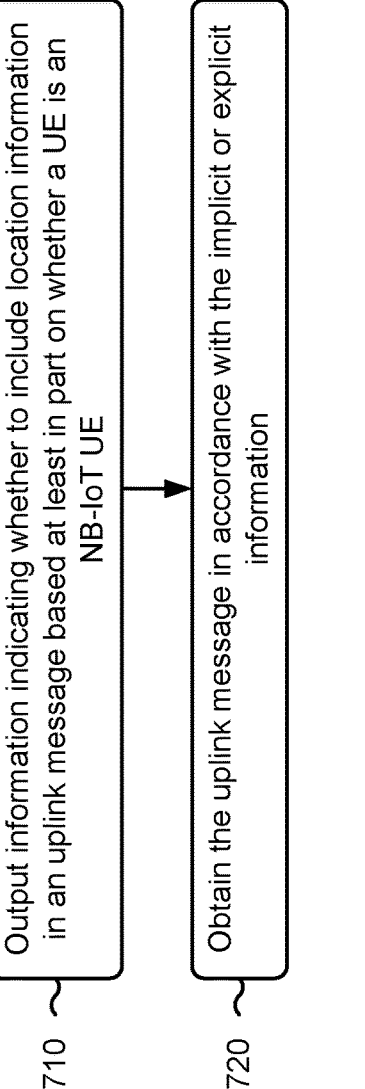
FIG. 7 is a diagram illustrating an example process performed, for example, by a network node, in accordance with the present disclosure.

FIG. 7 is a diagram illustrating an example process 700 performed, for example, by a network node, in accordance with the present disclosure. Example process 700 is an example where the network node (e.g., network node 110) performs operations associated with location information provision for NB-IoT.

As shown in FIG. 7, in some aspects, process 700 may include outputting information indicating whether to include location information in an uplink message based at least in part on whether a UE is an NB-IoT UE (block 710). For example, the network node (e.g., using transmission component 904 and/or communication manager 906, depicted in FIG. 9) may output information indicating whether to include location information in an uplink message based at least in part on whether a UE is an NB-IoT UE, as described above.

As further shown in FIG. 7, in some aspects, process 700 may include obtaining the uplink message in accordance with the implicit or explicit information (block 720). For example, the network node (e.g., using reception component 902 and/or communication manager 906, depicted in FIG. 9) may obtain the uplink message in accordance with the implicit or explicit information, as described above.

Process 700 may include additional aspects, such as any single aspect or any combination of aspects described below and/or in connection with one or more other processes described elsewhere herein.

In a first aspect, the uplink message includes the location information based at least in part on the implicit or explicit information indicating to include the location information.

In a second aspect, alone or in combination with the first aspect, the uplink message does not include the location information based at least in part on the implicit or explicit information indicating not to include the location information.

In a third aspect, alone or in combination with one or more of the first and second aspects, the implicit or explicit information indicating whether to include the location information in the uplink message is included in a UE information request message, and the uplink message is a radio link failure report.

In a fourth aspect, alone or in combination with one or more of the first through third aspects, process 700 includes establishing access stratum security with the UE prior to receiving the implicit or explicit information, wherein the implicit or explicit information is included in at least one of a radio resource control message or a medium access control control element.

In a fifth aspect, alone or in combination with one or more of the first through fourth aspects, process 700 includes establishing access stratum security with the UE prior to receiving the implicit or explicit information, wherein the implicit or explicit information is included in a non-access-stratum message.

In a sixth aspect, alone or in combination with one or more of the first through fifth aspects, the implicit or explicit information indicates to include the location information based at least in part on user consent to providing the location information having been obtained.

In a seventh aspect, alone or in combination with one or more of the first through sixth aspects, the implicit or explicit information indicating whether to include the location information is included in a radio link failure report request, and outputting the implicit or explicit information indicating whether to include the location information further comprises outputting the radio link failure report request without having provided an indication of radio link failure report availability.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
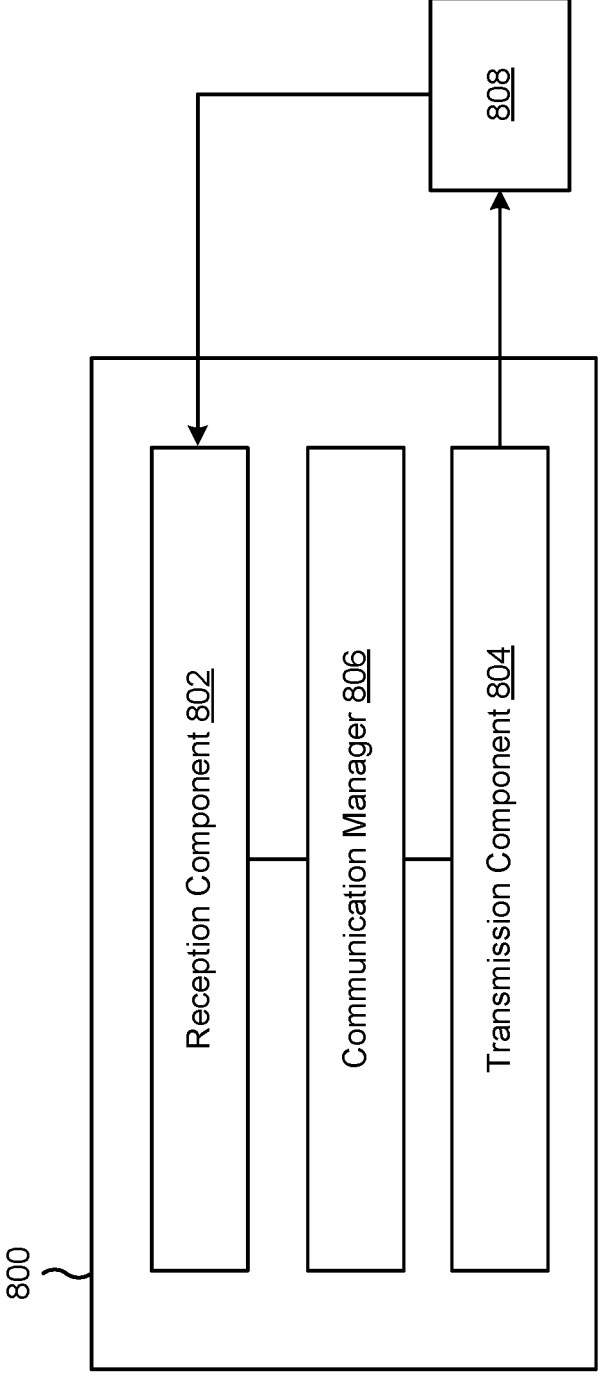
FIG. 8 is a diagram of an example apparatus for wireless communication, in accordance with the present disclosure.

FIG. 8 is a diagram of an example apparatus 800 for wireless communication, in accordance with the present disclosure. The apparatus 800 may be a UE, or a UE may include the apparatus 800. In some aspects, the apparatus 800 includes a reception component 802, a transmission component 804, and/or a communication manager 806, which may be in communication with one another (for example, via one or more buses and/or one or more other components). In some aspects, the communication manager 806 is the communication manager 140 described in connection with FIG. 1. As shown, the apparatus 800 may communicate with another apparatus 808, such as a UE or a network node (such as a CU, a DU, an RU, or a base station), using the reception component 802 and the transmission component 804.

In some aspects, the apparatus 800 may be configured to perform one or more operations described herein in connection with FIG. 4. Additionally, or alternatively, the apparatus 800 may be configured to perform one or more processes described herein, such as process 500 of FIG. 5, process 600 of FIG. 6, or a combination thereof. In some aspects, the apparatus 800 and/or one or more components shown in FIG. 8 may include one or more components of the UE described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 808. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the UE described in connection with FIG. 2.

The transmission component 804 may transmit communications, such as reference signals, control information, data communications, or a combination thereof, to the apparatus 808. In some aspects, one or more other components of the apparatus 800 may generate communications and may provide the generated communications to the transmission component 804 for transmission to the apparatus 808. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 808. In some aspects, the transmission component 804 may include one or more antennas, a modem, a modulator, a transmit MIMO processor, a transmit processor, a controller/processor, a memory, or a combination thereof, of the UE described in connection with FIG. 2. In some aspects, the transmission component 804 may be co-located with the reception component 802 in a transceiver.

The communication manager 806 may support operations of the reception component 802 and/or the transmission component 804. For example, the communication manager 806 may receive information associated with configuring reception of communications by the reception component 802 and/or transmission of communications by the transmission component 804. Additionally, or alternatively, the communication manager 806 may generate and/or provide control information to the reception component 802 and/or the transmission component 804 to control reception and/or transmission of communications.

The reception component 802 may receive implicit or explicit information indicating whether to include location information in an uplink message based at least in part on whether the UE is an NB-IoT UE. The transmission component 804 may transmit the uplink message in accordance with the implicit or explicit information.

The communication manager 806 may establish access stratum security prior to receiving the implicit or explicit information, wherein the implicit or explicit information is included in at least one of a radio resource control message or a medium access control control element.

The communication manager 806 may establish access stratum security prior to receiving the implicit or explicit information, wherein the implicit or explicit information is included in a non-access-stratum message.

The reception component 802 may receive a UE information request message for NB-IoT UEs, wherein the UE is an NB-IoT UE. The transmission component 804 may transmit a radio link failure report in response to the UE information request message, wherein the radio link failure report omits location information of the UE based at least in part on the UE being an NB-IoT UE.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
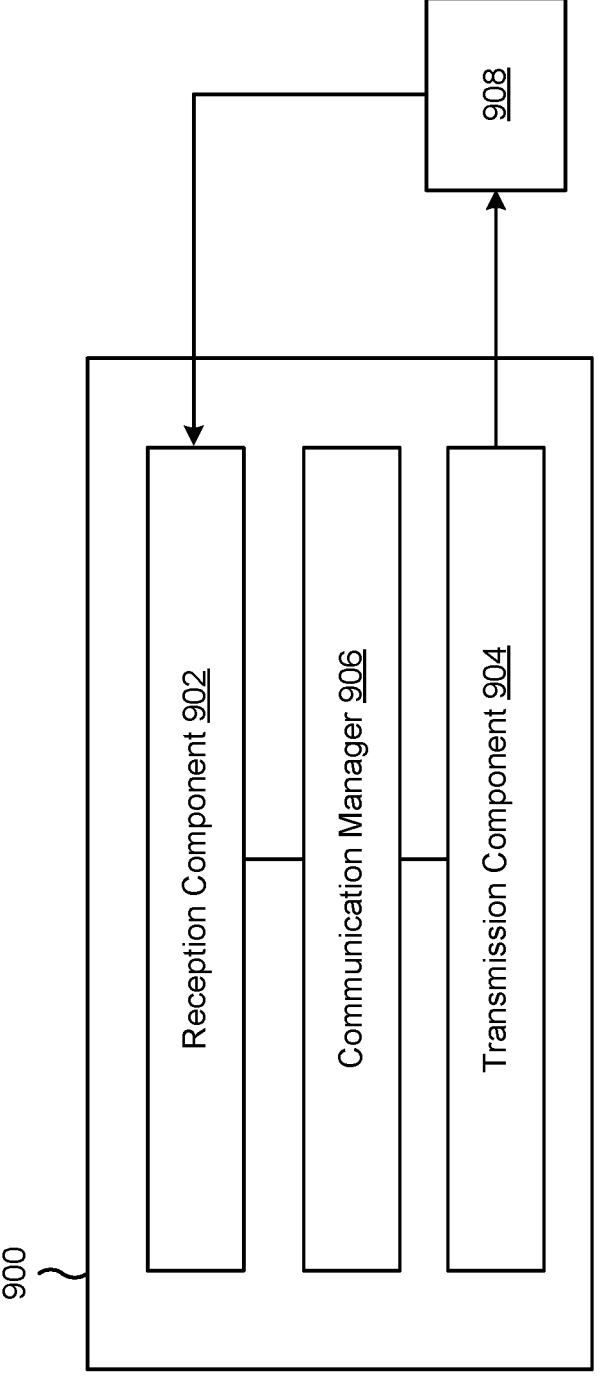
FIG. 9 is a diagram of an example apparatus for wireless communication, in accordance with the present disclosure.

FIG. 9 is a diagram of an example apparatus 900 for wireless communication, in accordance with the present disclosure. The apparatus 900 may be a network node, or a network node may include the apparatus 900. In some aspects, the apparatus 900 includes a reception component

902, a transmission component 904, and/or a communication manager 906, which may be in communication with one another (for example, via one or more buses and/or one or more other components). In some aspects, the communication manager 906 is the communication manager 150 described in connection with FIG. 1. As shown, the apparatus 900 may communicate with another apparatus 908, such as a UE or a network node (such as a CU, a DU, an RU, or a base station), using the reception component 902 and the transmission component 904.

In some aspects, the apparatus 900 may be configured to perform one or more operations described herein in connection with FIG. 4. Additionally, or alternatively, the apparatus 900 may be configured to perform one or more processes described herein, such as process 700 of FIG. 7, or a combination thereof. In some aspects, the apparatus 900 and/or one or more components shown in FIG. 9 may include one or more components of the network node described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 908. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the network node described in connection with FIG. 2. In some aspects, the reception component 902 and/or the transmission component 904 may include or may be included in a network interface. The network interface may be configured to obtain and/or output signals for the apparatus 900 via one or more communications links, such as a backhaul link, a midhaul link, and/or a fronthaul link.

The transmission component 904 may transmit communications, such as reference signals, control information, data communications, or a combination thereof, to the apparatus 908. In some aspects, one or more other components of the apparatus 900 may generate communications and may provide the generated communications to the transmission component 904 for transmission to the apparatus 908. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 908. In some aspects, the transmission component 904 may include one or more antennas, a modem, a modulator, a transmit MIMO processor, a transmit processor, a controller/processor, a memory, or a combination thereof, of the network node described in connection with FIG. 2. In some aspects, the transmission component 904 may be co-located with the reception component 902 in a transceiver.

The communication manager 906 may support operations of the reception component 902 and/or the transmission component 904. For example, the communication manager 906 may receive information associated with configuring reception of communications by the reception component 902 and/or transmission of communications by the transmission component 904. Additionally, or alternatively, the communication manager 906 may generate and/or provide control information to the reception component 902 and/or the transmission component 904 to control reception and/or transmission of communications.

The transmission component 904 may output information indicating whether to include location information in an uplink message based at least in part on whether a UE is an NB-IoT UE. The reception component 902 may obtain the uplink message in accordance with the implicit or explicit information.

The communication manager 906 may establish access stratum security with the UE prior to receiving the implicit or explicit information, wherein the implicit or explicit information is included in at least one of a radio resource control message or a medium access control control element.

The communication manager 906 may establish access stratum security with the UE prior to receiving the implicit or explicit information, wherein the implicit or explicit information is included in a non-access-stratum message.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides some details of the present disclosure:

Some techniques described herein provide a way forward to resolve a user consent issue for UE location in RLF report. Support of an LPP protocol is optional. Other than LPP-based positioning, an RLF report may be a message where NB-IoT UE can include UE location. When connectivity to NTN was introduced for NB-IoT, same RLF report format was used without change by default in NTN. However, the NB-IoT UE with connectivity to NTN may be mandated to provide GNSS location information, in certain examples. The NB-IoT UE location report may be in an RLF report, which may have a purpose for an SON. This report may be available (e.g., only) when RLF occurs. In some examples, this is not for anything specific to NTN purpose, e.g., proper CN selection based on the country where the UE is authorized to operate. In some locations, user consent may be required for eNB to obtain UE location depending on location regulation. However, in some contexts, the eNB may obtain UE location from NB-IoT UE without user consent via RLF report regardless of regulation.

The RLF report may be an optional feature for NB-IoT UEs. If the UE supports it, then after RLF, the UE prepares the RLF report. The RLF report also includes location information, if the UE has GNSS location information. NTN capable NB-IoT UE may always have valid GNSS coordinates. When (re)establishing an RRC connection, the UE indicates to network in msg5 that it has RLF report available. Then network may request the UE to send the RLF report via UEInformationRequest-NB message. This does not tell UE whether the network has obtained user consent for location report. Then UE provides the RLF report including location info in RLF-Report-NB in UEInformationResponse-NB message. Unlike in a Terrestrial network, the NB-IoT UE in NTN is supposed to have the GNSS location information available.

In some aspects, if the network has not obtained user consent, network will never set bit for RLF request in UEInformationRequest-NB message (i.e., no user consent, no RLF report). In some aspects, in NTN, it is assumed the user consent is implicit, i.e., connectivity to NTN is assumed the user consent has been implicitly provided. In some aspects, a new indication in UEInformationRequest-NB message may indicate whether network has obtained user consent and UE should include the UE location information in RLF report. In some aspects, the UE location information is not included in RLF report.

The following provides illustrative examples relating to the present disclosure.

5.3.11.3 Detection of Radio Link Failure

The UE shall:

1> in case any DAPS bearer is configured, only the target PCell is considered in the following;

1>upon T310 expiry; or

1>upon T312 expiry; or

1>upon T318 expiry; or

1>upon random access problem indication from MCG MAC while neither T300, T301, T304 nor T311 is running; or 1>upon indication from MCG RLC, which is allowed to be send on PCell, that the maximum number of retransmissions has been reached for an SRB or DRB:

2>consider radio link failure to be detected for the MCG i.e. RLF;

2>discard any segments of segmented RRC messages received;

2> store the following radio link failure information in the VarRLF-Report (VarRLF-Report-NB in NB-IoT) by setting its fields as follows:

3>clear the information included in VarRLF-Report (VarRLF-Report-NB in NB-IoT), if any;

3> set the plmn-IdentityList to include the list of EPLMNs stored by the UE (i.e. includes the RPLMN);

3> set the measResultLastServCell to include the RSRP and RSRQ, if available, of the PCell based on measurements collected up to the moment the UE detected radio link failure;

3>except for NB-IoT, set the measResultNeighCells to include the best measured cells, other than the PCell, ordered such that the best cell is listed first, and based on measurements collected up to the moment the UE detected radio link failure, and set its fields as follows;

4> if the UE was configured to perform measurements for one or more EUTRA frequencies, include the measResultListEUTRA;

4> if the UE was configured to perform measurement reporting for one or more neighbouring UTRA frequencies, include the measResultListUTRA;

4> if the UE was configured to perform measurement reporting for one or more neighbouring GERAN frequencies, include the measResultListGERAN;

4> if the UE was configured to perform measurement reporting for one or more neighbouring CDMA2000 frequencies, include the measResultsCDMA2000;

4> if the UE was configured to perform measurement reporting, not related to NR sidelink communication, for one or more neighbouring NR frequencies, include the measResultListNR;

4> for each neighbour cell included, include the optional fields that are available;

NOTE 1: The measured quantities are filtered by the L3 filter as configured in the mobility measurement configuration. The measurements are based on the time domain measurement resource restriction, if configured. Exclude-listed cells are not required to be reported.

3>except for NB-IoT, if available, set the logMeasResultListWLAN to include the WLAN measurement results, in order of decreasing RSSI for WLAN APs;

3>except for NB-IoT, if available, set the logMeasResultListBT to include the Bluetooth measurement results, in order of decreasing RSSI for Bluetooth beacons;

3>except for NB-IoT connected to NTN, if detailed location information is available, set the content of the locationInfo as follows:

4> include the locationCoordinates;

4> include the horizontalVelocity, if available;

3> set the failedPCellId to the global cell identity, if available, and otherwise, except for NB-IoT, to the physical cell identity and carrier frequency of the PCell where radio link failure is detected;

3>except for NB-IoT, set the tac-FailedPCell to the tracking area code, if available, of the PCell where radio link failure is detected;

3>except for NB-IoT, if an RRCConnectionReconfiguration message including the mobilityControlInfo was received before the connection failure:

4> if the last RRCConnectionReconfiguration message including the mobilityControlInfo concerned an intra E-UTRA handover:

5> include the previousPCellId and set it to the global cell identity of the PCell where the last RRCConnectionReconfiguration message including mobilityControlInfo was received;

5> set the timeConnFailure to the elapsed time since reception of the last RRCConnectionReconfiguration message including the mobilityControlInfo;

4> if the last RRCConnectionReconfiguration message including the mobilityControlInfo concerned a handover to E-UTRA from UTRA and if the UE supports Radio Link Failure Report for Inter-RAT MRO:

5> include the previousUTRA-CellId and set it to the physical cell identity, the carrier frequency and the global cell identity, if available, of the UTRA Cell in which the last RRCConnectionReconfiguration message including mobilityControlInfo was received;

5> set the timeConnFailure to the elapsed time since reception of the last RRCConnectionReconfiguration message including the mobilityControlInfo;

4> if the last RRCConnectionReconfiguration message including the mobilityControlInfo concerned a handover to E-UTRA from NR and if the UE supports Radio Link Failure Report for Inter-RAT MRO NR:

5> include the previousNR-PCellId and set it to the global cell identity of the PCell where the last RRCConnectionReconfiguration message including mobilityControlInfo was received embedded in NR RRC message MobilityFromNRCommand message as specified in TS 38.331 clause 5.4.3.3;

5> set the timeConnFailure to the elapsed time since reception of the last RRCConnectionReconfiguration message including the mobilityControlInfo embedded in NR RRC message MobilityFromNRCommand message as specified in TS 38.331 clause 5.4.3.3.

3>except for NB-IoT, if the UE supports QCI1 indication in Radio Link Failure Report and has a DRB for which QCI is 1:

4> include the drb-EstablishedWithQCI-1;

3>except for NB-IoT, set the connectionFailure Type to rlf,

3>except for NB-IoT, set the c-RNTI to the C-RNTI used in the PCell;

3>except for NB-IoT, set the rlf-Cause to the trigger for detecting radio link failure;

2> if the UE is configured with (NG)EN-DC; and

2> if T316 is configured; and

2> if SCG transmission is not suspended; and

2> if the SCG is not deactivated; and

2> if neither NR PSCell change nor NR PSCell addition is ongoing (i.e. T304 for the NR PSCell is not running as specified in TS 38.331 [82], clause 5.3.5.5.2, in (NG)EN-DC):

3> initiate the MCG failure information procedure as specified in 5.6.26 to report MCG radio link failure;

2> else:

3> if AS security has not been activated:

4> if the UE is a NB-IoT UE:

5> if the UE is connected to EPC and the UE supports RRC connection re-establishment for the Control Plane CIoT EPS optimisation; or 5> if the UE is connected to 5GC, the UE supports RRC connection re-establishment for the Control Plane CIoT 5GS optimisation and the UE is configured with a truncated 5G-S-TMSI:

6> initiate the RRC connection re-establishment procedure as specified in 5.3.7;

5> else:

6> perform the actions upon leaving RRC_CONNECTED as specified in 5.3.12, with release cause 'RRC connection failure';

4> else:

5> perform the actions upon leaving RRC_CONNECTED as specified in 5.3.12, with release cause 'other';

3> else:

4> initiate the connection re-establishment procedure as specified in 5.3.7;

In case of DC or NE-DC, the UE shall:

1>upon T313 expiry; or

1>upon random access problem indication from SCG MAC; or

1>upon indication from SCG RLC, which is allowed to be sent on PSCell, that the maximum number of retransmissions has been reached for an SCG, for a split DRB or for a split SRB:

2>consider radio link failure to be detected for the SCG i.e. SCG-RLF;

2> if the UE is configured with DC; or

2> if the UE is configured with NE-DC and MCG transmission is not suspended:

3> initiate the SCG failure information procedure as specified in 5.6.13 to report SCG radio link failure;

2> else:

3> initiate the connection re-establishment procedure as specified in TS 38.331 [82], clause 5.3.7.

In case of CA PDCP duplication, the UE shall:

1>upon indication from an RLC entity, which is restricted to be sent on SCell only, that the maximum number of retransmissions has been reached:

2> initiate the failure information procedure as specified in 5.6.21 to report RLC failure of type duplication;

If any DAPS bearer is configured and T304 is running, the UE shall:

1>upon T310 expiry for the source PCell; or

1>upon random access problem indication from source MCG MAC; or

1>upon indication from source MCG RLC, which is allowed to be sent on source PCell, that the maximum number of retransmissions has been reached for an DRB:

2>consider radio link failure to be detected for the source MCG;

2>suspend the transmission of all DRBs in the source MCG;

2>reset MAC for the source MCG;

2>release the source connection;

The UE may discard the radio link failure information, i.e. release the UE variable VarRLF-Report (VarRLF-Report-NB in NB-IoT), 48 hours after the radio link failure is detected, upon power off or upon detach, and for NB-IoT, upon entering another RAT.

The UEInformationResponse-NB message is used by the UE to transfer the information requested by the E-UTRAN. The UEInformationResponse-NB message includes a locationInfo field. This field is not included when connected to NTN.

The following provides an overview of some Aspects of the present disclosure:

Aspect 1: A method of wireless communication performed by a user equipment (UE), comprising: receiving implicit or explicit information indicating whether to include location information in an uplink message based at least in part on whether the UE is a narrowband Internet of Things (NB-IoT) UE; and transmitting the uplink message in accordance with the implicit or explicit information.

Aspect 2: The method of Aspect 1, wherein the uplink message includes the location information based at least in part on the implicit or explicit information indicating to include the location information.

Aspect 3: The method of any of Aspects 1-2, wherein the uplink message does not include the location information based at least in part on the implicit or explicit information indicating not to include the location information.

Aspect 4: The method of any of Aspects 1-3, wherein the implicit or explicit information indicating whether to include the location information in the uplink message is included in a UE information request message, and wherein the uplink message is a radio link failure report.

Aspect 5: The method of any of Aspects 1-4, further comprising establishing access stratum security prior to receiving the implicit or explicit information, wherein the implicit or explicit information is included in at least one of a radio resource control message or a medium access control control element.

Aspect 6: The method of any of Aspects 1-5, further comprising establishing access stratum security prior to receiving the implicit or explicit information, wherein the implicit or explicit information is included in a non-access-stratum message.

Aspect 7: The method of any of Aspects 1-6, wherein the implicit or explicit information indicates to include the location information based at least in part on user consent, associated with the UE, to providing the location information having been obtained.

Aspect 8: The method of any of Aspects 1-7, wherein the implicit or explicit information indicating whether to include the location information is included in a radio link failure report request, and wherein receiving the implicit or explicit information indicating whether to include the location information further comprises receiving the radio link failure report request without having provided an indication of radio link failure report availability.

Aspect 9: A method of wireless communication performed by a user equipment (UE), comprising: receiving a UE information request message for narrowband Internet of Things (NB-IoT) UEs, wherein the UE is an NB-IoT UE; and transmitting a radio link failure report in response to the UE information request message, wherein the radio link failure report omits location information of the UE based at least in part on the UE being an NB-IoT UE.

Aspect 10: A method of wireless communication performed by a network node, comprising: outputting information indicating whether to include location information in an uplink message based at least in part on whether a user equipment (UE) is a narrowband Internet of Things (NB-IoT) UE; and obtaining the uplink message in accordance with the implicit or explicit information.

Aspect 11: The method of Aspect 10, wherein the uplink message includes the location information based at least in part on the implicit or explicit information indicating to include the location information.

Aspect 12: The method of any of Aspects 10-11, wherein the uplink message does not include the location information based at least in part on the implicit or explicit information indicating not to include the location information.

Aspect 13: The method of any of Aspects 10-12, wherein the implicit or explicit information indicating whether to include the location information in the uplink message is included in a UE information request message, and wherein the uplink message is a radio link failure report.

Aspect 14: The method of any of Aspects 10-13, further comprising establishing access stratum security with the UE prior to receiving the implicit or explicit information, wherein the implicit or explicit information is included in at least one of a radio resource control message or a medium access control control element.

Aspect 15: The method of any of Aspects 10-14, further comprising establishing access stratum security with the UE prior to receiving the implicit or explicit information, wherein the implicit or explicit information is included in a non-access-stratum message.

Aspect 16: The method of any of Aspects 10-15, wherein the implicit or explicit information indicates to include the location information based at least in part on user consent to providing the location information having been obtained.

Aspect 17: The method of any of Aspects 10-16, wherein the implicit or explicit information indicating whether to include the location information is included in a radio link failure report request, and wherein outputting the implicit or explicit information indicating whether to include the location information further comprises outputting the radio link failure report request without having provided an indication of radio link failure report availability.

Aspect 18: An apparatus for wireless communication at a device, comprising a processor; memory coupled with the processor; and instructions stored in the memory and executable by the processor to cause the apparatus to perform the method of one or more of Aspects 1-17.

Aspect 19: A device for wireless communication, comprising a memory and one or more processors coupled to the memory, the one or more processors configured to perform the method of one or more of Aspects 1-17.

Aspect 20: An apparatus for wireless communication, comprising at least one means for performing the method of one or more of Aspects 1-17.

Aspect 21: A non-transitory computer-readable medium storing code for wireless communication, the code comprising instructions executable by a processor to perform the method of one or more of Aspects 1-17.

Aspect 22: A non-transitory computer-readable medium storing a set of instructions for wireless communication, the set of instructions comprising one or more instructions that, when executed by one or more processors of a device, cause the device to perform the method of one or more of Aspects 1-17.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:

a memory; and one or more processors, coupled to the memory, configured to:

receive implicit or explicit information indicating whether to include location information in an uplink message based at least in part on whether the UE is a narrowband Internet of Things (NB-IoT) UE, wherein the implicit or explicit information is included in a radio link failure report request that is received without the UE having provided an indication of radio link failure report availability; and transmit the uplink message in accordance with the implicit or explicit information.

2. The UE of claim 1, wherein the uplink message includes the location information based at least in part on the implicit or explicit information indicating to include the location information.

3. The UE of claim 1, wherein the uplink message does not include the location information based at least in part on the implicit or explicit information indicating not to include the location information.

4. The UE of claim 1, wherein the implicit or explicit information indicating whether to include the location information in the uplink message is included in a UE information request message, and wherein the uplink message is a radio link failure report.

5. The UE of claim 1, wherein the one or more processors are further configured to establish access stratum security prior to receiving other implicit or explicit information, wherein the other implicit or explicit information indicating whether to include location information in another uplink message is included in at least one of a radio resource control message or a medium access control element.

6. The UE of claim 1, wherein the one or more processors are further configured to establish access stratum security prior to receiving other implicit or explicit information, wherein the other implicit or explicit information indicating whether to include location information in another uplink message is included in a non-access-stratum message.

7. The UE of claim 1, wherein the implicit or explicit information indicates to include the location information based at least in part on user consent, associated with the UE, to providing the location information having been obtained.

8. A network node for wireless communication, comprising:

a memory; and one or more processors, coupled to the memory, configured to:

output implicit or explicit information indicating whether to include location information in an uplink message based at least in part on whether a user equipment (UE) is a narrowband Internet of Things (NB-IoT) UE, wherein the implicit or explicit information is included in a radio link failure report request that is transmitted without the UE having provided an indication of radio link failure report availability to the network node; and obtain the uplink message in accordance with the implicit or explicit information.

9. The network node of claim 8, wherein the uplink message includes the location information based at least in part on the implicit or explicit information indicating to include the location information.

10. The network node of claim 8, wherein the uplink message does not include the location information based at least in part on the implicit or explicit information indicating not to include the location information.

11. The network node of claim 8, wherein the implicit or explicit information indicating whether to include the location information in the uplink message is included in a UE information request message, and wherein the uplink message is a radio link failure report.

12. The network node of claim 8, wherein the one or more processors are further configured to establish access stratum security with the UE prior to receiving other implicit or explicit information, wherein the other implicit or explicit information indicating whether to include location information in another uplink message is included in at least one of a radio resource control message or a medium access control element.

13. The network node of claim 8, wherein the one or more processors are further configured to establish access stratum security with the UE prior to receiving other implicit or explicit information, wherein the other implicit or explicit information indicating whether to include location information in another uplink message is included in a non-access-stratum message.

14. The network node of claim 8, wherein the implicit or explicit information indicates to include the location information based at least in part on user consent to providing the location information having been obtained.

15. A method of wireless communication performed by a user equipment (UE), comprising:

receiving implicit or explicit information indicating whether to include location information in an uplink message based at least in part on whether the UE is a narrowband Internet of Things (NB-IoT) UE, wherein the implicit or explicit information is included in a radio link failure report request that is received without the UE having provided an indication of radio link failure report availability; and transmitting the uplink message in accordance with the implicit or explicit information.

16. The method of claim 15, wherein the uplink message includes the location information based at least in part on the implicit or explicit information indicating to include the location information.

17. The method of claim 15, wherein the uplink message does not include the location information based at least in part on the implicit or explicit information indicating not to include the location information.

18. The method of claim 15, wherein the implicit or explicit information indicating whether to include the location information in the uplink message is included in a UE information request message, and wherein the uplink message is a radio link failure report.

19. The method of claim 15, further comprising establishing access stratum security prior to receiving other implicit or explicit information, wherein the other implicit or explicit information indicating whether to include location information in another uplink message is included in at least one of a radio resource control message or a medium access control element.

20. The method of claim 15, further comprising establishing access stratum security prior to receiving other implicit or explicit information, wherein the other implicit or explicit information indicating whether to include location information in another uplink message is included in a non-access-stratum message.

21. The method of claim 15, wherein the implicit or explicit information indicates to include the location information based at least in part on user consent, associated with the UE, to providing the location information having been obtained.

22. A method of wireless communication performed by a network node, comprising:

outputting implicit or explicit information indicating whether to include location information in an uplink message based at least in part on whether a user equipment (UE) is a narrowband Internet of Things (NB-IoT) UE, wherein the implicit or explicit information is included in a radio link failure report request that is transmitted without the UE having provided an indication of radio link failure report availability to the network node; and obtaining the uplink message in accordance with the implicit or explicit information.

23. The method of claim 22, wherein the uplink message includes the location information based at least in part on the implicit or explicit information indicating to include the location information.

24. The method of claim 22, wherein the uplink message does not include the location information based at least in part on the implicit or explicit information indicating not to include the location information.

25. The method of claim 22, wherein the implicit or explicit information indicating whether to include the location information in the uplink message is included in a UE information request message, and wherein the uplink message is a radio link failure report.

26. The method of claim 22, further comprising establishing access stratum security with the UE prior to receiving other implicit or explicit information, wherein the other implicit or explicit information indicating whether to include location information in another uplink message is included in at least one of a radio resource control message or a medium access control element.

27. The method of claim 22, further comprising establishing access stratum security with the UE prior to receiving other implicit or explicit information, wherein the other implicit or explicit information indicating whether to include location information in another uplink message is included in a non-access-stratum message.

28. The method of claim 22, wherein the implicit or explicit information indicates to include the location information based at least in part on user consent to providing the location information having been obtained.

29. The UE of claim 1, wherein the UE is a non-terrestrial network (NTN) device, and the uplink message includes global navigational satellite system (GNSS) coordinates corresponding to the UE.

30. The network node of claim 8, wherein the UE is a non-terrestrial network (NTN) device, and the uplink message includes global navigational satellite system (GNSS) coordinates corresponding to the UE.

* * * * *